June 29, 1937.  C. B. KEYS  2,085,260
TRAILER COUPLING
Filed Jan. 8, 1936
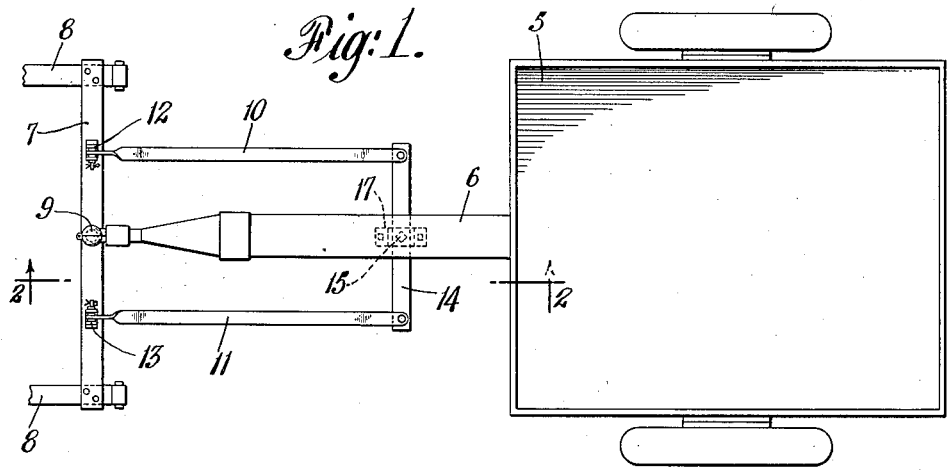
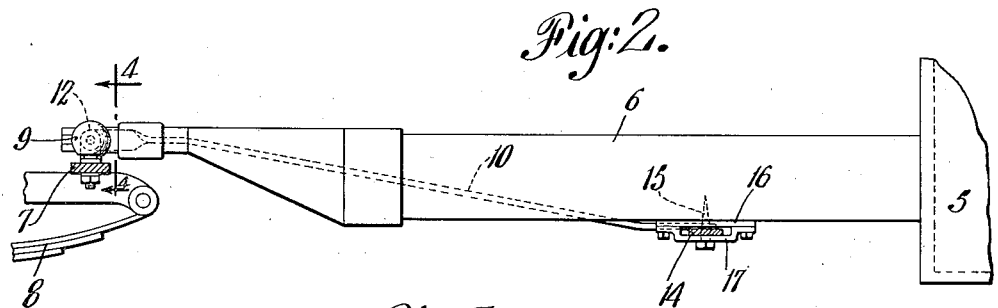
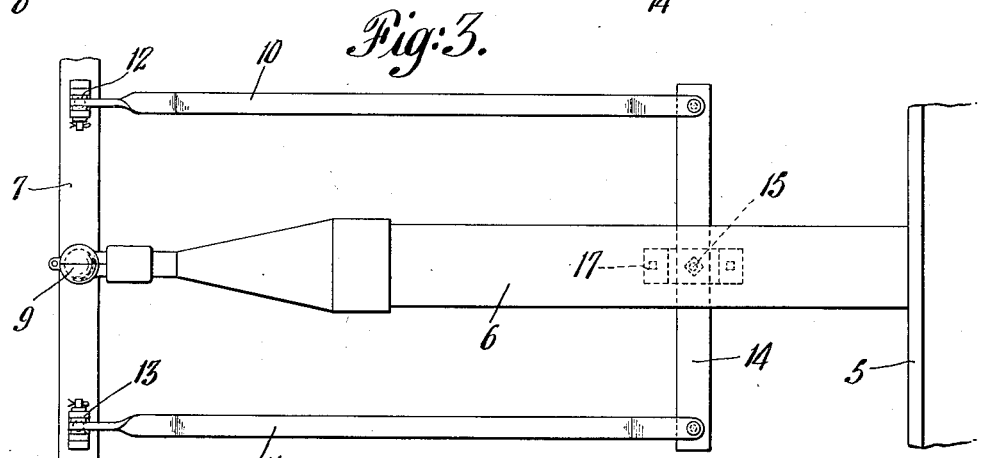
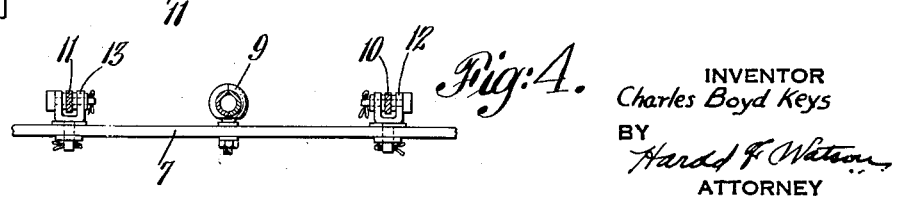
INVENTOR
Charles Boyd Keys
BY
Harold F. Watson
ATTORNEY Patented June 29, 1937

2,085,260

UNITED STATES PATENT OFFICE 2,085,260

TRAILER COUPLING

Charles Boyd Keys, Forest Glen, Md.

Application January 8, 1936, Serial No. 58,080

1 Claim. (Cl. 280—33.44)

This invention relates to traction couplings, and more particularly to improved coupling means for motor drawn trailers, such as those commonly used with tractors, motor trucks and other motor vehicles.

An object of the present invention is the provision of auxiliary coupling means for use in conjunction with the usual universal type coupling means employed with single pole trailers having two or more wheels, whereby the use of such trailers is attended with increased safety and convenience. A further object is the provision of improved coupling means whereby greater stability is imparted to such trailers, while in transit, than is provided by the usual type of coupling. Other and further objects, features and advantages will appear from the following description and the accompanying drawing, in which:

Fig. 1 is a plan view of a trailer provided with the improved coupling of the present invention;

Fig. 2 is an enlarged side view in section on line 2—2 of Fig. 1, of a coupling of the present invention as applied to a conventional single pole trailer;

Fig. 3 is an enlarged plan view of the coupling means of Fig. 1; and Fig. 4 is a transverse section on line 4—4 of Fig. 2.

Referring to Fig. 1, a conventional trailer 5 having a single pole or tongue 6 is secured to a draw bar 7, affixed in any suitable manner to the rear end of a tractor or motor vehicle 8, by means of a universal or ball and socket type of coupling such as is in common use, the latter being designated by the numeral 9. Such coupling means are frequently supplemented, in use, by a chain or other flexible coupling means, in order that, in the event of a failure of the primary coupling, such auxiliary coupling means will come into play to prevent the runaway of the trailer as well as to transmit tractive effort. However, as will readily be appreciated, such flexible auxiliary couplings possess several inherent disadvantages, which it is the object of the present invention to overcome. In the first place, in the event of the failure of the primary coupling means while traversing a down grade, the chain or other flexible auxiliary coupling means will not prevent the trailer from overriding the tractor, thereby causing damage to one or both of the vehicles. Nor will it prevent the trailer from swerving from side to side, endangering the trailer and contents as well as constituting a serious road hazard. Furthermore, in the case of a two wheeled trailer, if the chain is adjusted somewhat loosely, that is, with any considerable amount of slack, it may permit the forward end of the trailer to tilt downward until the pole or some other portion of the trailer comes in contact with the road surface, or an obstruction thereon, with the resulting damage to the trailer. Under such circumstances it is even likely that the trailer may be upset, with considerable damage, if the failure of the primary coupling occurs while the vehicles are moving at a fair rate of speed.

All of the foregoing dangers and disadvantages may be overcome by the use of an auxiliary coupling constructed according to the present invention, which will now be described.

The auxiliary coupling means of the present invention consists essentially of a system of rigid links connected by pivots and secured to the trailer and tractor in such a manner as to permit of free and unhampered manipulation of the trailer while at the same time serving, in the event of a failure of the primary coupling means, to avoid the objections and disadvantages to which the usual flexible auxiliary coupling means is subject.

The preferred form of the present invention is illustrated in the accompanying drawing, and comprises a pair of parallel longitudinal links 10 and 11, secured in spaced relationship to the drawbar 7 by means of universal connections 12 and 13, and pivoted at their rearward ends to the opposite extremities of a transverse link 14, which in turn is centrally pivoted upon the under side of the trailer pole 6 by means of a lag screw 15 or other suitable means. Preferably the transverse link 14 is provided with a bearing consisting of a flat upper plate 16, secured against the under side of the pole 6, and a suitably shaped lower plate 17 similarly secured.

By virtue of the universal connections 12 and 13 the trailer is permitted to assume any vertical angularity, with relation to the tractor, that will be encountered in actual service, while the pivoted connections between the several links, and between the transverse link 14 and the pole 6, will permit of wide relative horizontal angularity between the two vehicles.

In normal service, while the primary coupling means remains intact, experience has shown that the auxiliary means of the present invention exerts a stabilizing influence upon the trailer, causing it to "track" better, and reducing the swaying and swerving to which two wheeled trailers, particularly, are subject.

In case of failure of the primary coupling means, the auxiliary means of the present invention provides an entirely separate and dependable coupling means free of the objections and disadvantages above noted. While the universal connections 12 and 13 permit of vertical angularity between the vehicles, the pivotal connections between the several links and between the transverse link 14 and the pole 6 are such as to prevent vertical angularity therebetween, and the pole 6 is therefore maintained in approximately its normal position. The trailer is prevented from overriding the tractor, and is caused to "track" behind the tractor, thus preventing excessive swerving or swaying. The auxiliary coupling means is also effective in backing, whereas this maneuver is difficult or impossible with the usual flexible auxiliary coupling means.

It will be appreciated that the coupling means of the present invention may, if desired, be employed as a primary or sole coupling means, the primary coupling means described above being dispensed with. It will likewise be obvious that the present invention may take other specific forms than that described, while still employing the novel features of the invention.

It will be understood that throughout the specification and claims the terms "tractor" and "trailer" are used in a broad sense to denote the driving and the driven vehicles or units, respectively.

The terms and expressions employed herein are used for purposes of description and not of limitation. It is recognized that many modifications of the construction disclosed may be made within the scope of the present invention.

I claim:

A connection for use between a tractor and a trailer, including a draft member rigidly secured to the trailer, a transverse member rigidly secured to the tractor, a universal connection acting between said transverse member and said draft member, a plurality of universal connecting means secured to said transverse member and spaced equally to either side of said first universal connection, spaced rearwardly extending parallel links connected to said second universal means, a transverse link pivoted about a vertical axis at its center to said draft member and at each end to one of said parallel links, and means secured to said draft member and embracing said transverse link to restrain movement of same against all but horizontal deflections.

CHARLES BOYD KEYS.